United States Patent
Chao et al.

(10) Patent No.: US 12,501,163 B2
(45) Date of Patent: Dec. 16, 2025

(54) OPTICAL SYSTEM AND CONTROL METHOD

(71) Applicant: TDK TAIWAN CORP., Taoyuan (TW)

(72) Inventors: Ko-Lun Chao, Taoyuan (TW); Yi-Ho Chen, Taoyuan (TW); Ya-Hsiu Wu, Taoyuan (TW); Ying-Jen Wang, Taoyuan (TW); Sin-Jhong Song, Taoyuan (TW); Cheng-Jui Chang, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 48 days.

(21) Appl. No.: 18/320,755

(22) Filed: May 19, 2023

(65) Prior Publication Data

US 2023/0379586 A1 Nov. 23, 2023

Related U.S. Application Data (60) Provisional application No. 63/344,326, filed on May 20, 2022.

(51) Int. Cl.
*H04N 7/18* (2006.01)
*G06F 1/16* (2006.01)
*H04N 23/695* (2023.01)

(52) U.S. Cl.
CPC ......... *H04N 23/695* (2023.01); *G06F 1/1686* (2013.01)

(58) Field of Classification Search
CPC .................................................. H04N 23/695
USPC .......................................................... 348/169
See application file for complete search history.

(56) References Cited

U.S. PATENT DOCUMENTS

| | | | | |
|---|---|---|---|---|
| 5,801,919 | A * | 9/1998 | Griencewic | G06F 1/1616 361/679.26 |
| 9,436,294 | B2 * | 9/2016 | Chu | G06F 1/1694 |
| 10,218,942 | B2 * | 2/2019 | Tucker | H04N 7/142 |
| 10,284,823 | B1 * | 5/2019 | Amarilio | H04N 23/74 |
| 11,375,125 | B2 * | 6/2022 | Wu | H04N 23/695 |
| 2005/0201047 | A1 * | 9/2005 | Krah | G06F 1/1616 361/679.55 |
| 2006/0139326 | A1 * | 6/2006 | Tsukamoto | G06F 1/3218 345/158 |
| 2009/0002797 | A1 * | 1/2009 | Kwong | H04N 23/58 348/E5.04 |
| 2014/0210707 | A1 * | 7/2014 | Holz | G06F 3/017 345/156 |
| 2015/0097768 | A1 * | 4/2015 | Holz | G02B 5/04 348/47 |
| 2018/0059510 | A1 * | 3/2018 | Gustaveson, II | G03B 11/043 |
| 2018/0292866 | A1 * | 10/2018 | Tucker | G06F 1/1694 |
| 2019/0116317 | A1 * | 4/2019 | Hu | G02B 7/023 |
| 2019/0230262 | A1 * | 7/2019 | Wang | H04N 23/57 |
| 2019/0310357 | A1 * | 10/2019 | Davis | G06F 1/1616 |

(Continued)

*Primary Examiner* — Leron Beck
(74) *Attorney, Agent, or Firm* — MUNCY, GEISSLER, OLDS & LOWE, P.C.

(57) ABSTRACT

An optical system, disposed on an electrical device, including a movable portion, a connected portion, and a driving assembly. The movable portion is connected to an optical module. The connected portion connects the movable portion to the electrical device. The driving assembly drives the movable portion to move relative to the electrical device.

12 Claims, 7 Drawing Sheets

(56) References Cited

U.S. PATENT DOCUMENTS

| | | | | |
|---|---|---|---|---|
| 2019/0324499 | A1* | 10/2019 | Miyamoto | G06F 1/1616 |
| 2020/0341348 | A1* | 10/2020 | Imai | H04N 23/55 |
| 2020/0366850 | A1* | 11/2020 | Wu | H04N 23/698 |
| 2021/0258459 | A1* | 8/2021 | Zhang | H04N 23/67 |
| 2021/0342487 | A1* | 11/2021 | Yu | G06F 3/0652 |
| 2021/0348911 | A1* | 11/2021 | Rizzardini | G05B 17/02 |
| 2023/0101960 | A1* | 3/2023 | Zhu | G06F 1/1686 348/373 |

* cited by examiner

OPTICAL SYSTEM AND CONTROL METHOD

CROSS REFERENCE TO RELATED APPLICATIONS

The present application claims priority to U.S. Provisional Patent Application No. 63/344,326, filed May 20, 2022, which are incorporated by reference herein in their entirety.

BACKGROUND OF THE INVENTION

Field of the Invention

The present invention relates to an optical system.

Description of the Related Art

In recent years, people have been working from home and using online meetings more frequently. Most of the laptops currently on the market only have lenses fixed on the screen end. However, if a user needs to present his/her location from different angles in the online meeting, they may only move the laptop to desired angles. Or if the user needs to perform a moving, someone else is needed for moving the laptop to capture the user's moving.

BRIEF SUMMARY OF THE INVENTION

Therefore, the present invention uses an optical system to enable the user to present the user's location or the user's moving from various angles without moving the laptop by anyone. An embodiment of the invention provides an optical system, disposed on an electrical device, including a movable portion, a connected portion, and a driving assembly. The movable portion is connected to an optical module. The connected portion connects the movable portion to the electrical device. The driving assembly drives the movable portion to move relative to the electrical device.

According to some embodiments of the present disclosure, the electrical device includes a fixed piece and a movable piece. The movable piece is movable relative to the fixed piece. The movable portion is connected to the movable piece, and the movable portion is movable relative to the movable piece.

According to some embodiments of the present disclosure, the optical system further includes a first sensing assembly, sensing a position of the movable piece relative to the fixed piece and outputting first sensing information.

According to some embodiments of the present disclosure, the optical system further includes a control assembly controlling the driving assembly, and the control assembly includes a control element and a storage element. The control element outputs a control signal to the driving assembly. The storage element stores default information. The control element compares the first sensing information with the default information after receiving the first sensing information, and then outputs the control signal.

According to some embodiments of the present disclosure, the driving assembly performs a driving mode to drive the movable portion after receiving the control signal, the driving mode includes a first mode, a second mode, a third mode, and a fourth mode. The first mode drives the movable portion to a closed location relative to the movable piece, wherein the movable portion is in the closed location when an angle between the movable portion and the movable piece is 0°. The second mode drives the movable portion to move in a first range relative to the movable piece. The third mode drives the movable portion to move in a second range relative to the movable piece. The fourth mode drives the movable portion to be fixed on a certain location.

According to some embodiments of the present disclosure, the default information includes first critical information and second critical information, the first critical information is the first sensing information output by the first sensing assembly when the movable piece is located in a first critical position relative to the fixed piece. The second critical information is the first sensing information output by the first sensing assembly when the movable piece is located in a second critical position relative to the fixed piece. The first sensing assembly includes an angle sensor arranged in the electrical device, and the first sensing information is an angle value between the movable piece and the fixed piece.

According to some embodiments of the present disclosure, the second critical information is greater than the first critical information.

According to some embodiments of the present disclosure, the control element controls the driving assembly to perform the first mode when the first sensing information is smaller than the first critical information. The control element controls the driving assembly to perform the second mode when the first sensing information is between the first critical information and the second critical information. The control element controls the driving assembly to perform the third mode when the first sensing information is greater than the second critical information.

According to some embodiments of the present disclosure, the electronic device further includes an operating assembly for outputting a first operating signal to the control assembly. The operating assembly is used to output a second operating signal to the control assembly. When the control assembly receives the first operating signal, the control element controls the driving assembly to perform the first mode. When the control assembly receives the second operating signal, the control element controls the driving assembly to perform the fourth mode.

According to some embodiments of the present disclosure, the optical system further includes a second sensing assembly, sensing a condition of the movable piece relative to surrounding and outputting second sensing information.

According to some embodiments of the present disclosure, the second sensing assembly includes a gravity sensor disposed on the movable piece, and the second sensing information is a gravity direction of the movable piece. The control assembly controls the driving assembly to perform the driving mode according to the first sensing information and the second sensing information.

According to some embodiments of the present disclosure, the optical system further includes a third sensing assembly, used to sense an object relative to the optical system and outputting third sensing information, wherein the control assembly controls the driving assembly according to the third sensing information.

According to some embodiments of the present disclosure, the third sensing assembly is the optical module including a camera disposing on the movable portion. The control assembly controls the driving assembly to perform the second mode or the third mode, and the movable portion is driven to make the camera be able to catch the object's image until the movable portion is moved to a limiting angle relative to the movable piece.

According to some embodiments of the present disclosure, the optical system further includes a fourth sensing assembly, used to sense a motion of the movable portion relative to the movable piece and outputting fourth sensing information, wherein the control assembly controls the driving assembly according to the fourth sensing information.

According to some embodiments of the present disclosure, the fourth sensing assembly includes an angle sensor disposed on the movable piece or movable portion, and the fourth sensing information is an angle value between the movable piece and the movable portion. The control assembly controls the driving assembly to perform the driving mode according to the fourth sensing information.

According to some embodiments of the present disclosure, a control method for controlling the optical system includes sensing angle information between the movable piece and the fixed piece, comparing the angle information with default information, and determining a driving mode.

According to some embodiments of the present disclosure, the control method further includes performing a first mode of the driving mode, performing a second mode of the driving mode, performing a third mode of the driving mode, and performing a fourth mode of the driving mode. The first mode is driving the movable portion to a closed location relative to the movable piece when the angle information is smaller than first critical information of the default information. The second mode is driving the movable portion to move in a first range relative to the movable piece when the angle information is greater than the first critical information and smaller than second critical information of the default information. The third mode is driving the movable portion to move in a second range relative to the movable piece when the angle information is greater than the second critical information. The fourth mode is driving the movable portion to be fixed in a certain location.

According to some embodiments of the present disclosure, driving the movable portion to move in the first range is driving the movable portion to a first location and then the movable portion is driven to move back and forth within the first range starting from the first location. Driving the movable portion to move in the second range is driving the movable portion to a second location and then the movable portion is driven to move back and forth within the second range starting from the second location.

According to some embodiments of the present disclosure, the control method further includes sensing the gravity direction of the movable piece while sensing the angle information between the movable piece and the fixed piece.

According to some embodiments of the present disclosure, the control method further includes sensing image information of an object, and performing a tracking mode of the driving mode. The tracking mode is driving a camera disposed on the optical module to track the object, and driving the movable portion to make the camera be able to catch the object's image until the movable portion is moved to a limiting angle relative to the movable piece.

BRIEF DESCRIPTION OF THE DRAWINGS

Aspects of this disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF THE INVENTION

In the following detailed description, for the purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept can be embodied in various forms without being limited to those exemplary embodiments. In addition, the drawings of different embodiments can use like and/or corresponding numerals to denote like and/or corresponding elements in order to clearly describe the present disclosure. However, the use of like and/or corresponding numerals in the drawings of different embodiments does not suggest any correlation between different embodiments. The directional terms, such as "up", "down", "left", "right", "front" or "rear", are reference directions for accompanying drawings. Therefore, using the directional terms is for description instead of limiting the disclosure.

It should be understood that when an element is referred to as being "connected to" or "coupled to" another element, the element may be directly connected or coupled to another element, or there are one or more elements between the two elements. In addition, the use of ordinal numbers such as first, second, and third does not necessarily imply a sense of order, but can be multiple instances to distinguish actions or structures.

Reference to "one embodiment" or "an embodiment" throughout the specification means that particular features, structures, or characteristics described in conjunction with the embodiment are included in at least one embodiment. Therefore, the sentences "in one embodiment" or "in an embodiment" appearing in various places throughout the specification do not necessarily all refer to the same embodiment. In addition, in one or more embodiments, specific features, structures, or characteristics may be combined in any suitable manner.

Figure 1:
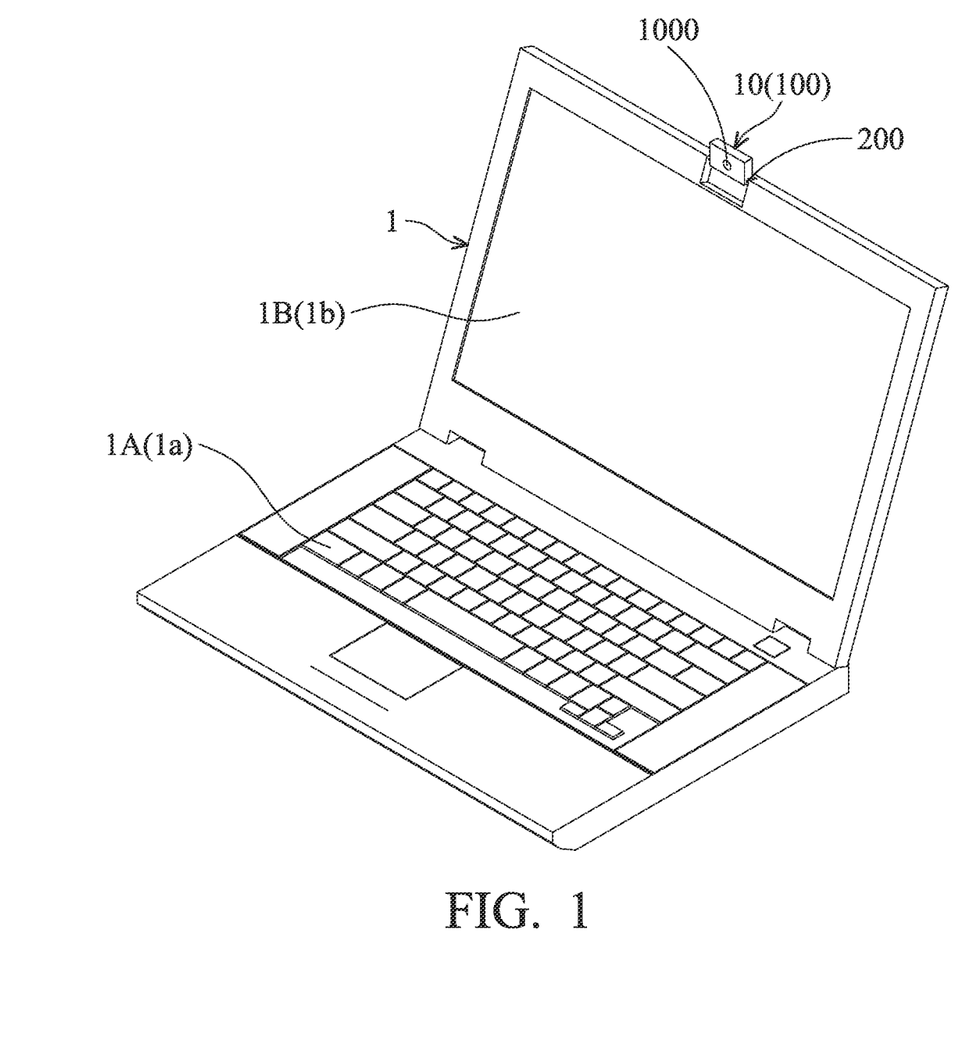
FIG. 1 is a schematic diagram view showing an optical system disposed on an electrical device according to an embodiment of the present disclosure.
Figure 2:
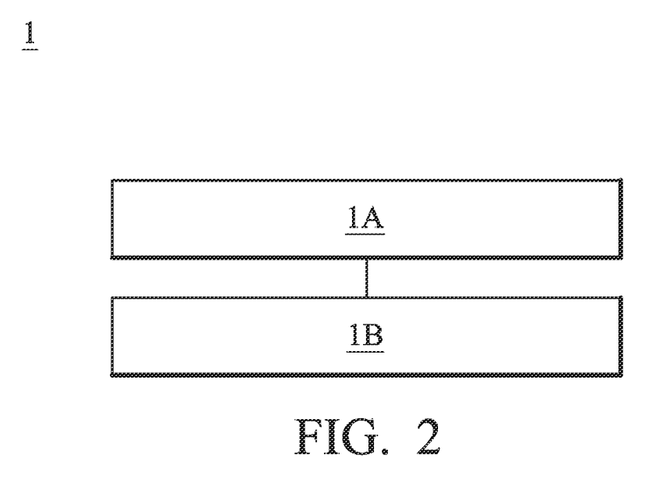
FIG. 2 is a block diagram showing main components of the electrical device according to an embodiment of the present disclosure.
Figure 3:
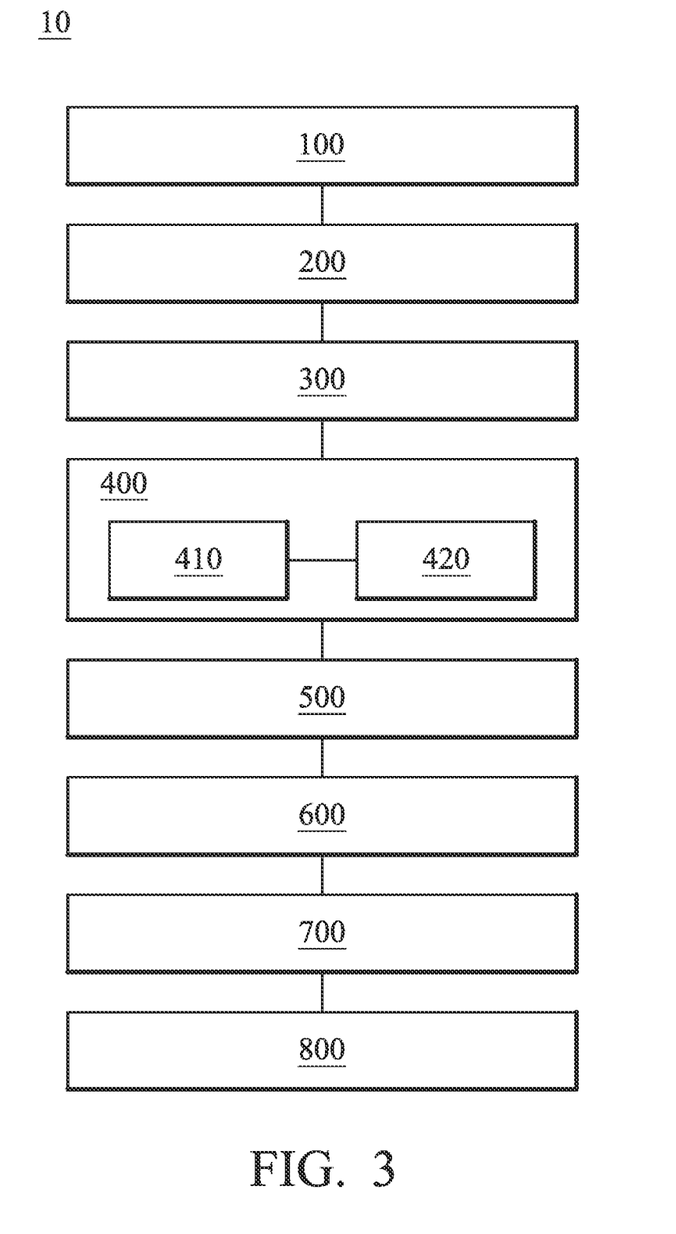
FIG. 3 is a block diagram showing main portions of the optical system according to an embodiment of the present disclosure.

Refer to FIG. 1 to FIG. 3. FIG. 1 is a schematic diagram view showing an optical system 10 disposed on an electrical device 1 according to an embodiment of the present disclosure. FIG. 2 is a block diagram showing main components of the electrical device 1 according to an embodiment of the present disclosure. FIG. 3 is a block diagram showing main portions of an optical system according to an embodiment of the present disclosure. The electrical device 1 includes a fixed piece 1A and a movable piece 1B. The movable piece 1B is movable relative to the fixed piece 1A.

In this embodiment, the electrical device 1 may be a laptop. The movable piece 1B has a display portion 1b, such as a screen, and the fixed piece 1A has an operating assembly 1a, such as keyboard.

The optical system 10 includes a movable portion 100, a connected portion 200, a driving assembly 300, a control assembly 400, and the first sensing assembly 500. The movable portion 100 is connected to an optical module 1000. In some embodiments, the optical module 1000 may be a camera. The connected portion 200 connects the movable portion to the electrical device 1. In more detail, the movable portion 100 is connected to the movable piece 1B by the connected portion 200. In some embodiments, the connected portion 200 may be a pivot mechanism, which connects the movable portion 100 and the movable piece 1B.

The movable portion 100 is movable relative to the movable piece 1B. In more detail, the driving assembly 300 drives the movable portion 100 to move relative to the movable piece 1B of the electrical device 1. In some embodiments, the driving assembly 300 may be a VCM driving mechanism, a PIEZO driving mechanism, or a SMA driving mechanism which is used to drive the movable portion 100.

The control assembly 400 controls the driving assembly 300, and the control assembly 400 includes a control element 410 and a storage element 420. The control element outputs a control signal to the driving assembly 300. The storage element stores default information.

The first sensing assembly 500 senses a position of the movable piece 1B relative to the fixed piece 1A and outputting first sensing information θ. The first sensing assembly 500 includes an angle sensor arranged in the electrical device 1, and the first sensing information θ is an angle value between the movable piece 1B and the fixed piece 1A. The control element 400 compares the first sensing information θ with the default information after receiving the first sensing information θ, and then outputs the control signal.

Figure 4:
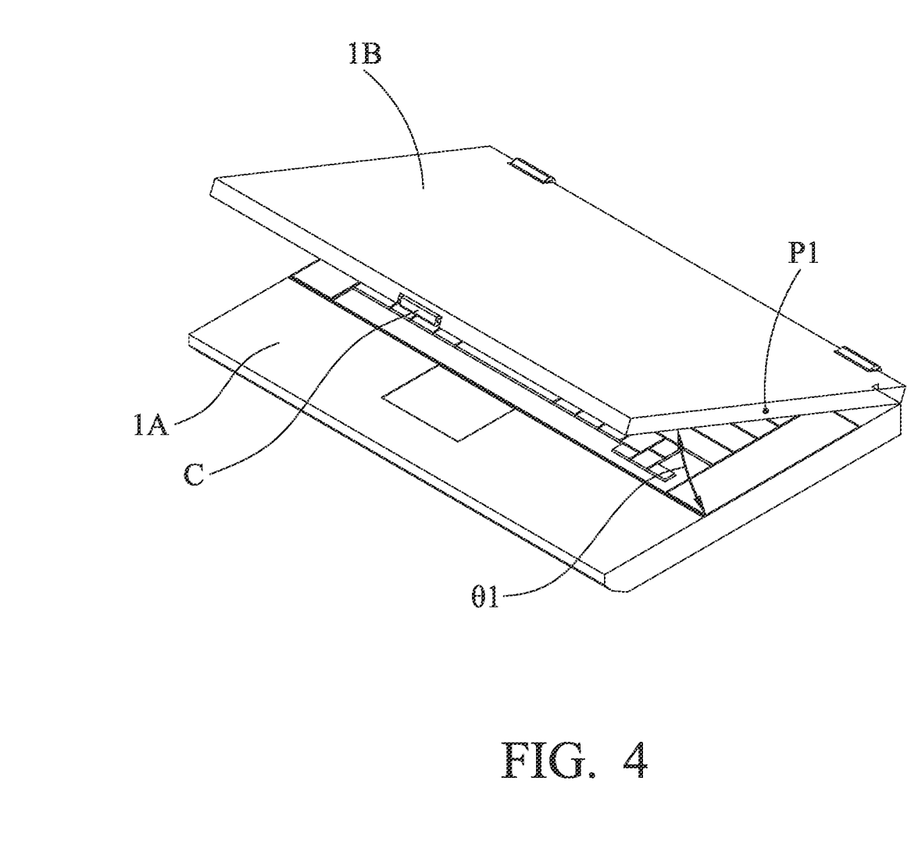
FIG. 4 is a schematic diagram showing the movable piece of the electrical device in a first critical position.
Figure 5:
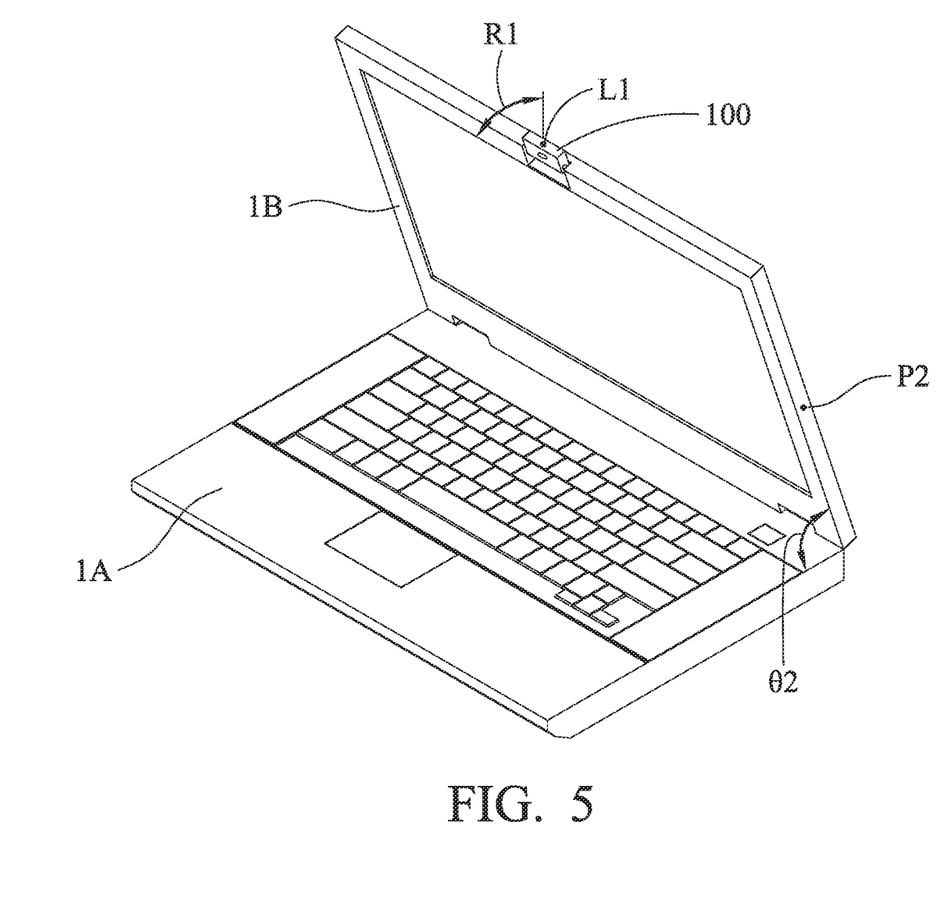
FIG. 5 is a schematic diagram showing the movable piece of the electrical device in a second critical position.

Refer to FIG. 4 and FIG. 5. FIG. 4 is a schematic diagram showing the movable piece 1B in a first critical position P1. FIG. 5 is a schematic diagram showing the movable piece 1B in a second critical position P2. The default information includes first critical information θ1 and second critical information θ2, the first critical information θ1 is the first sensing information θ output by the first sensing assembly 500 when the movable piece 1B is located in the first critical position P1 relative to the fixed piece 1A. The second critical information θ2 is the first sensing information θ output by the first sensing assembly 500 when the movable piece 1B is located in the second critical position P2 relative to the fixed piece 1A. The second critical information θ2 is greater than the first critical information θ1.

Figure 6:
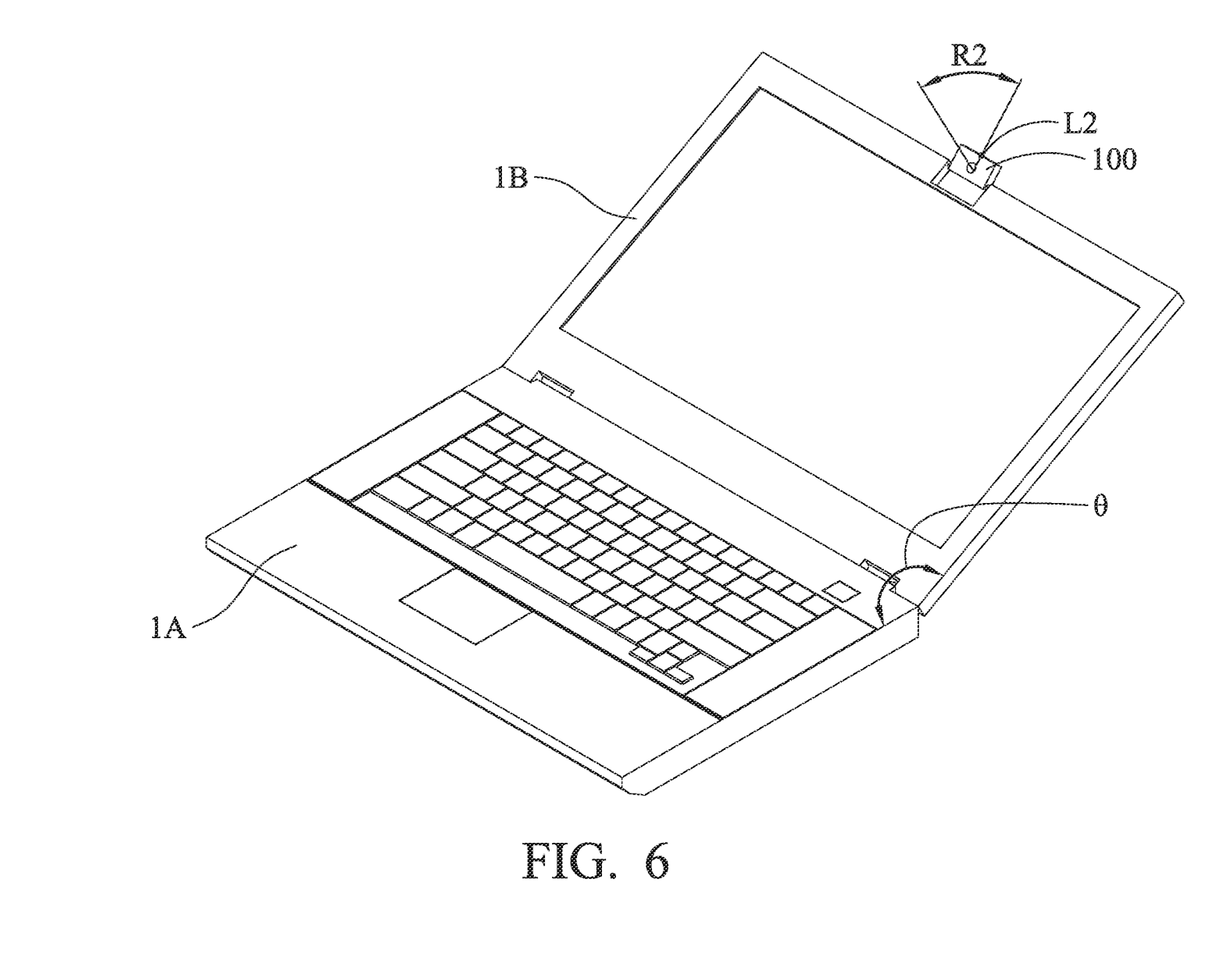
FIG. 6 is a schematic diagram showing the optical system performing a driving mode according to an embodiment of the present disclosure.

The driving assembly 300 performs a driving mode to drive the movable portion 100 after receiving the control signal, the driving mode includes a first mode, a second mode, a third mode, and a fourth mode. Refer to FIG. 1, and FIG. 4 to FIG. 6. FIG. 6 is a schematic diagram showing the optical system 10 performing the driving mode according to an embodiment of the present disclosure.

As shown in FIG. 4, in the first mode, the driving assembly 300 drives the movable portion 100 to a closed location C relative to the movable piece 1B. The movable portion 100 is in the closed location C when an angle between the movable portion and the movable piece is 0°.

As shown in FIG. 5, in the second mode, the driving assembly 300 drives the movable portion 100 to move in a first range R1 relative to the movable piece 1B. For example, the movable portion 100 is driven to a first location L1, and then be driven to move back and forth within the first range R1 starting from the first location L1.

As shown in FIG. 6, in the third mode, the driving assembly 300 drives the movable portion 100 to move in a second range R2 relative to the movable piece 1B. For example, the movable portion 100 is driven to a second location L2 and then be driven to move back and forth within the second range R2 starting from the second location L2. The second location L2 is different from the first location L1.

As shown in FIG. 1, in the fourth mode, the driving assembly 300 drives the movable portion 100 to be fixed on a certain location.

The control element 410 may control the driving assembly 300 to perform the first mode when the first sensing information θ is smaller than the first critical information θ1. In other words, if the angle θ between the fixed piece 1A and the movable piece 1B is smaller than the first critical information θ1, the control element 410 may control the driving assembly 300 to move the movable portion 100 to the closed location C.

The control element 410 may control the driving assembly 300 to perform the second mode when the first sensing information θ is between the first critical information θ1 and the second critical information θ2.

The control element 410 may control the driving assembly 300 to perform the third mode when the first sensing information θ is greater than the second critical information θ2.

In addition, the driving mode may be trigger by the operating assembly 1a used to outputting an operating signal to the control assembly 400. In more detail, a user may press a key of the keyboard, the keyboard (the operating assembly 1a) outputs a first operating signal to the control assembly 400, and the control element 410 controls the driving assembly 300 to perform the first mode when the control assembly 400 receives the first operating signal.

Or the user may press another key of the keyboard, the keyboard (the operating assembly 1a) outputs a second operating signal to the control assembly 400, and the control element 410 controls the driving assembly 300 to perform the fourth mode when the control assembly receives the second operating signal. In other words, the movable portion 100 may also be controlled by the user.

In some embodiments, the optical system 10 may further include a second sensing assembly 600. The second sensing assembly 600 senses a condition of the movable piece 1B relative to surrounding and outputting second sensing information. The second sensing assembly 600 may include a gravity sensor disposed on the movable piece, and the second sensing information is a gravity direction of the movable piece 1B. Therefore, condition of the surrounding may be known more clearly, and the control assembly 400 may control the driving assembly 300 to perform the driving mode more precisely according to the first sensing information θ and the second sensing information.

In addition, the optical system may further include a third sensing assembly 700. The third sensing assembly 700 may be used to sense an object relative to the optical system 10 and outputting third sensing information. In some embodiments, the third sensing assembly 700 is the optical module including a camera disposing on the movable portion 100. The control assembly 400 controls the driving assembly 300 according to the third sensing information.

In more detail, the control assembly 400 may control the driving assembly 300 to perform the second mode or the third mode, and the movable portion 100 is driven to make the camera be able to catch the object's image with the object's moving, until the movable portion 100 is moved to a limiting angle relative to the movable piece 1B. The limiting angle may be formed when the movable portion 100 is moved to, for example, an outmost location of the first range R1 or the second range R2.

Moreover, the optical system 10 further includes a fourth sensing assembly 800. The fourth sensing assembly 800 is used to sense a motion of the movable portion 100 relative to the movable piece 1B and outputting fourth sensing information. The control assembly 400 may control the driving assembly 300 according to the fourth sensing information. The fourth sensing assembly 800 includes an angle sensor, which may be disposed on the movable piece 1B or movable portion 100. The fourth sensing information is an angle value between the movable piece 1B and the movable portion 100. The control assembly 400 controls the driving assembly 300 to perform the driving mode according to the fourth sensing information.

Figure 7:
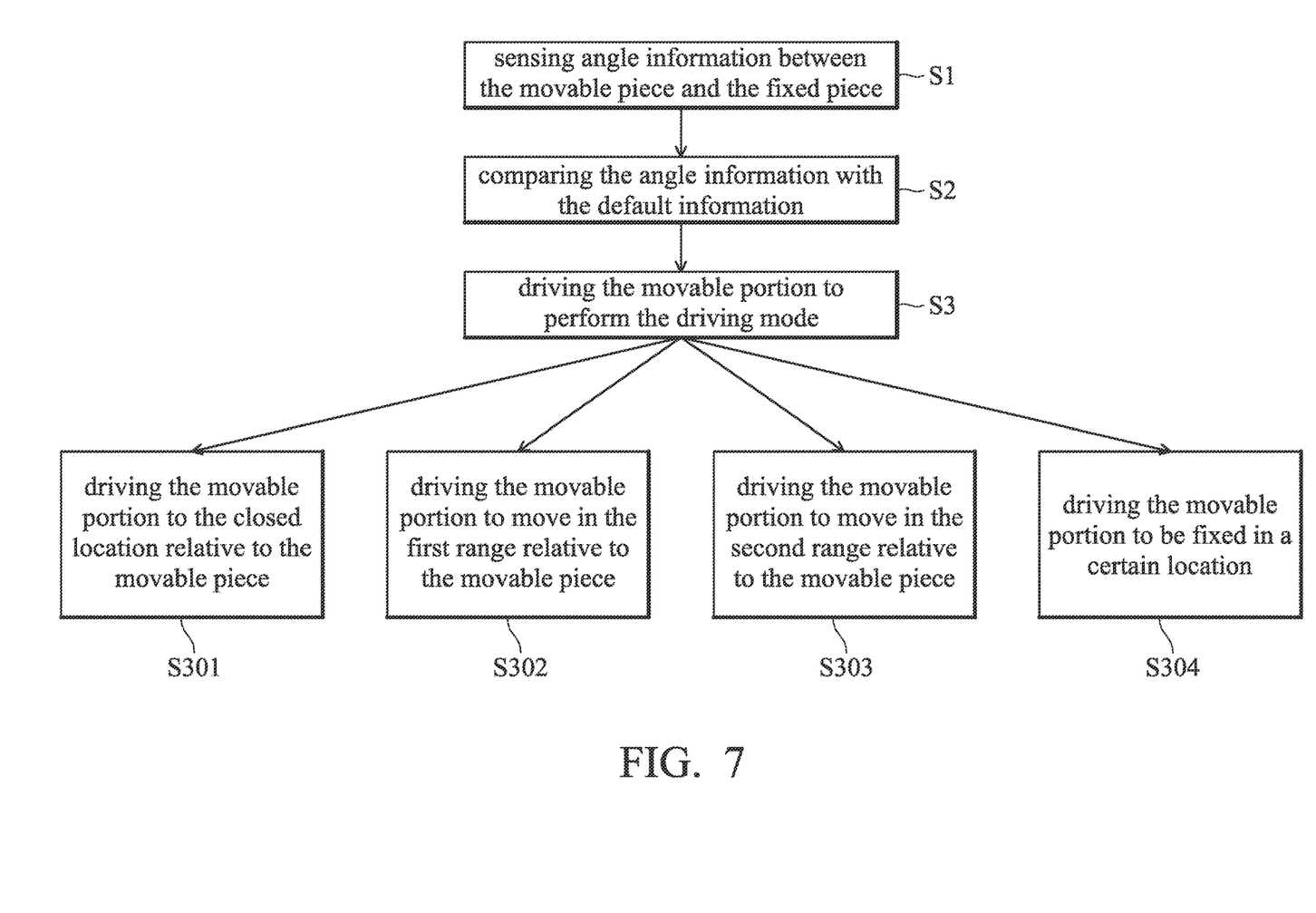
FIG. 7 is a flow diagram showing a control method for controlling the optical system according to an embodiment of the present disclosure.

Refer to FIG. 7. FIG. 7 is a flow diagram showing a control method for controlling the optical system 10 according to an embodiment of the present disclosure. The control method includes operation S1 of sensing the angle information θ between the movable piece 10B and the fixed piece 10A, operation S2 of comparing the angle information θ with the default information, and operation S3 of determining a driving mode.

An operation S301 is the first mode of the driving mode, which driving the movable portion 100 to the closed location C relative to the movable piece 1B. For example, when the angle information θ is smaller than the first critical information θ1 of the default information, the first mode is performed.

An operation S302 is the second mode of the driving mode, which driving the movable portion 100 to move in the first range R1 relative to the movable piece 1B. For example, when the angle information θ is greater than the first critical information θ1 and smaller than the second critical information θ2 of the default information, the second mode is performed.

An operation S303 is the third mode of the driving mode, which driving the movable portion 100 to move in a second range R2 relative to the movable piece 1B. For example, when the angle information θ is greater than the second critical information θ2.

An operation S304 is the fourth mode of the driving mode, which driving the movable portion 100 to be fixed in a certain location.

Driving the movable portion 100 to move in the first range R1 in the operation S302 is driving the movable portion 100 to the first location L1 and then the movable portion 100 is driven to move back and forth within the first range R1 starting from the first location L1. Driving the movable portion 100 to move in the second range R2 in the operation S303 is driving the movable portion 100 to the second location L2 and then the movable portion 100 is driven to move back and forth within the second range R2 starting from the second location L2.

The control method further includes an operation S101 of sensing the gravity direction of the movable piece 1B while sensing the angle information θ between the movable piece 1B and the fixed piece 1A.

The control method further includes an operation S102 of sensing image information of an object, and performing a tracking mode of the driving mode. The tracking mode is driving a camera disposed on the optical module 1000 to track the object, and driving the movable portion 100 to make the camera be able to catch the object's image until the movable portion 100 is moved to the limiting angle relative to the movable piece 1B.

To sum up, the present disclosure provides an optical system, disposed on an electrical device, including a movable portion, a connected portion, and a driving assembly. The movable portion is connected to an optical module. The connected portion connects the movable portion to the electrical device. The driving assembly drives the movable portion to move relative to the electrical device. Thereby, the optical system enables the user to present the user's location or the user's moving from various angles without moving the electrical device by anyone.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. An optical system, disposed on an electrical device, comprising:
    a movable portion, connected to an optical module;
    a connected portion, connecting the movable portion to the electrical device; and
    a driving assembly, driving the movable portion to move relative to the electrical device,
    wherein the electrical device comprises:
    a fixed piece; and
    a movable piece, movable relative to the fixed piece,
    wherein the movable portion is connected to the movable piece, and the movable portion is movable relative to the movable piece,
    wherein the optical system further comprises:
    a first sensing assembly, sensing a position of the movable piece relative to the fixed piece and outputting first sensing information, and
    a control assembly, controlling the driving assembly, comprising:
        a control element, outputting a control signal to the driving assembly; and
        a storage element, storing default information, wherein the control element compares the first sensing information with the default information after receiving the first sensing information, and then outputs the control signal to the driving assembly,
    wherein the electrical device further comprises an operating assembly that is a keyboard, outputting an operating signal to the control assembly when a user presses a key of the keyboard, wherein when the control assembly receives the operating signal, the control element outputting the operating signal to the driving assembly,
wherein the driving assembly performs a driving mode to drive the movable portion to move or be fixed relative to the movable piece after receiving the control signal or the operating signal;
wherein the driving mode comprising:
a first mode, driving the movable portion to a closed location relative to the movable piece, wherein the movable portion is in the closed location when an angle between the movable portion and the movable piece is 0°;
a second mode, driving the movable portion to move in a first range relative to the movable piece; and
a third mode, driving the movable portion to move in a second range relative to the movable piece;
wherein the default information comprises:
first critical information, which is the first sensing information output by the first sensing assembly when the movable piece is located in a first critical position relative to the fixed piece; and
second critical information, which is the first sensing information output by the first sensing assembly when the movable piece is located in a second critical position relative to the fixed piece,
wherein the first sensing assembly comprises an angle sensor arranged in the electrical device, and the first sensing information is an angle value between the movable piece and the fixed piece;
wherein the control element controls the driving assembly to perform the first mode when the first sensing information is smaller than the first critical information,
wherein the control element controls the driving assembly to perform the second mode when the first sensing information is between the first critical information and the second critical information,
wherein the control element controls the driving assembly to perform the third mode when the first sensing information is greater than the second critical information.

2. The optical system as claimed in claim 1, wherein the driving mode further comprising:
a fourth mode, driving the movable portion to be fixed on a certain location.

3. The optical system as claimed in claim 1, wherein the second critical information is greater than the first critical information.

4. The optical system as claimed in claim 2, wherein the operating signal comprises a first operating signal and a second operating signal,
wherein when the control assembly receives the first operating signal, the control element controls the driving assembly to perform the first mode,
wherein when the control assembly receives the second operating signal, the control element controls the driving assembly to perform the fourth mode.

5. The optical system as claimed in claim 2, further comprising a second sensing assembly, sensing a condition of the movable piece relative to surrounding and outputting second sensing information.

6. The optical system as claimed in claim 5, wherein the second sensing assembly comprises a gravity sensor disposed on the movable piece, and the second sensing information is a gravity direction of the movable piece, wherein the control assembly controls the driving assembly to perform the driving mode according to the first sensing information and the second sensing information.

7. The optical system as claimed in claim 2, further comprising a third sensing assembly, used to sense an object relative to the optical system and outputting third sensing information, wherein the control assembly controls the driving assembly according to the third sensing information.

8. The optical system as claimed in claim 7, wherein the third sensing assembly is the optical module comprising a camera disposing on the movable portion,
wherein the control assembly controls the driving assembly to perform the second mode or the third mode, and the movable portion is driven to make the camera be able to catch the object's image until the movable portion is moved to a limiting angle relative to the movable piece.

9. The optical system as claimed in claim 2, further comprising a fourth sensing assembly, used to sense a motion of the movable portion relative to the movable piece and outputting fourth sensing information, wherein the control assembly controls the driving assembly according to the fourth sensing information.

10. The optical system as claimed in claim 9, wherein the fourth sensing assembly comprises an angle sensor disposed on the movable piece or movable portion, and the fourth sensing information is an angle value between the movable piece and the movable portion,
wherein the control assembly controls the driving assembly to perform the driving mode according to the fourth sensing information.

11. A control method for controlling an optical system disposed on an electrical device,
wherein optical system comprises:
a movable portion, connected to an optical module;
a connected portion, connecting the movable portion to the electrical device; and
a driving assembly, driving the movable portion to move relative to the electrical device,
wherein the electrical device comprises:
a fixed piece; and
a movable piece, movable relative to the fixed piece,
wherein the movable portion is connected to the movable piece, and the movable portion is movable relative to the movable piece,
wherein the optical system further comprises:
a first sensing assembly, sensing a position of the movable piece relative to the fixed piece and outputting first sensing information, the first sensing assembly comprising an angle sensor arranged in the electrical device, and the first sensing information is an angle value between the movable piece and the fixed piece, and
a control assembly, controlling the driving assembly, comprising:
a control element, outputting a control signal to the driving assembly; and
a storage element, storing default information, wherein the control element compares the first sensing information with the default information after receiving the first sensing information, and then outputs the control signal to the driving assembly,
wherein the electrical device further comprises an operating assembly that is a keyboard, outputting an operating signal to the control assembly when a user presses a key of the keyboard, wherein when the control assembly receives the operating signal, the control element outputting the operating signal to the driving assembly,
wherein the driving assembly performs a driving mode to drive the movable portion to move or be fixed relative to the movable piece after receiving the control signal or the operating signal, the control method comprising:
sensing angle information between the movable piece and the fixed piece;
comparing the angle information with default information; and
sensing the gravity direction of the movable piece while sensing the angle information between the movable piece and the fixed piece; and
determining the driving mode;
performing a first mode of the driving mode, wherein the first mode is driving the movable portion to a closed location relative to the movable piece when the angle information is smaller than first critical information of the default information;
performing a second mode of the driving mode, wherein the second mode is driving the movable portion to move in a first range relative to the movable piece when the angle information is greater than the first critical information and smaller than second critical information of the default information;
performing a third mode of the driving mode, wherein the third mode is driving the movable portion to move in a second range relative to the movable piece when the angle information is greater than the second critical information; and
performing a fourth mode of the driving mode, wherein the fourth mode is driving the movable portion to be fixed in a certain location,
wherein driving the movable portion to move in the first range is driving the movable portion to a first location and then the movable portion is driven to move back and forth within the first range starting from the first location;
wherein driving the movable portion to move in the second range is driving the movable portion to a second location and then the movable portion is driven to move back and forth within the second range starting from the second location,
wherein the default information comprises:
first critical information, which is the first sensing information output by the first sensing assembly when the movable piece is located in a first critical position relative to the fixed piece; and
second critical information, which is the first sensing information output by the first sensing assembly when the movable piece is located in a second critical position relative to the fixed piece.

12. The control method as claimed in claim 11, further comprising:
sensing image information of an object; and
performing a tracking mode of the driving mode, wherein the tracking mode is driving a camera disposed on the optical module to track the object, and driving the movable portion to make the camera be able to catch the object's image until the movable portion is moved to a limiting angle relative to the movable piece.

* * * * *